US012542342B2

(12) United States Patent
Tokuda et al.

(10) Patent No.: US 12,542,342 B2
(45) Date of Patent: Feb. 3, 2026

(54) DIRECTIONAL COUPLER

(71) Applicant: Murata Manufacturing Co., Ltd., Kyoto (JP)

(72) Inventors: Daisuke Tokuda, Kyoto (JP); Ryangsu Kim, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 349 days.

(21) Appl. No.: 18/295,477

(22) Filed: Apr. 4, 2023

(65) Prior Publication Data

US 2023/0238678 A1 Jul. 27, 2023

Related U.S. Application Data

(63) Continuation of application No. PCT/JP2021/034405, filed on Sep. 17, 2021.

(30) Foreign Application Priority Data

Oct. 12, 2020 (JP) ................................ 2020-171639

(51) Int. Cl.
*H01P 5/18* (2006.01)

(52) U.S. Cl.
CPC ..................................... *H01P 5/18* (2013.01)

(58) Field of Classification Search
CPC .................................. H01P 5/18; H01P 5/187
See application file for complete search history.

(56) References Cited

U.S. PATENT DOCUMENTS

| | | | | |
|---|---|---|---|---|
| 6,771,141 | B2 * | 8/2004 | Iida | H01P 5/185 333/116 |
| 10,498,004 | B1 | 12/2019 | Ji et al. | |
| 11,894,597 | B2 * | 2/2024 | Tokuda | H01P 3/08 |
| 2011/0148544 | A1 * | 6/2011 | Hirai | H01P 5/185 333/116 |

(Continued)

FOREIGN PATENT DOCUMENTS

| | | | |
|---|---|---|---|
| CN | 1412887 | A | 4/2003 |
| JP | H11-68414 | A | 3/1999 |

(Continued)

OTHER PUBLICATIONS

International Search Report for PCT/JP2021/034405 dated Dec. 7, 2021.

*Primary Examiner* — Andrea Lindgren Baltzell
*Assistant Examiner* — Kimberly E Glenn
(74) *Attorney, Agent, or Firm* — McDonald Hopkins LLC

(57) ABSTRACT

A directional coupler includes a conductor serving as a primary line disposed in a multilayer body and conductors serving as a plurality of secondary lines that are disposed in the multilayer body and each of which is capable of being electromagnetically coupled to the conductor serving as the primary line. A facing area where the conductor serving as the secondary line and the conductor serving as the secondary line face each other is smaller than a facing area where the conductor serving as the secondary line and the conductor serving as the primary line face each other. A distance between the conductor serving as the secondary line and the conductor serving as the secondary line is longer than a distance between the conductor serving as the secondary line and the conductor serving as the primary line.

20 Claims, 9 Drawing Sheets

(56) References Cited

U.S. PATENT DOCUMENTS

| | | | |
|---|---|---|---|
| 2013/0141184 | A1 | 6/2013 | Tamaru et al. |
| 2016/0174361 | A1 | 6/2016 | Chen et al. |
| 2017/0048968 | A1 | 2/2017 | Komatsu |
| 2017/0141752 | A1 | 5/2017 | Hino |
| 2017/0317396 | A1 | 11/2017 | Srirattana et al. |
| 2018/0062236 | A1 | 3/2018 | Okamoto |
| 2020/0365965 | A1 | 11/2020 | Tokuda et al. |

FOREIGN PATENT DOCUMENTS

| | | | |
|---|---|---|---|
| JP | 2008-244924 | A | 10/2008 |
| JP | 2015-220425 | A | 12/2015 |
| WO | 2012/017713 | A1 | 2/2012 |
| WO | 2016/042990 | A1 | 3/2016 |
| WO | 2017/013927 | A1 | 1/2017 |
| WO | 2019/151448 | A1 | 8/2019 |

* cited by examiner

DIRECTIONAL COUPLER

CROSS REFERENCE TO RELATED APPLICATION

This is a continuation of International Application No. PCT/JP2021/034405 filed on Sep. 17, 2021 which claims priority from Japanese Patent Application No. 2020-171639 filed on Oct. 12, 2020. The contents of these applications are incorporated herein by reference in their entireties.

BACKGROUND ART

Technical Field

The present disclosure relates to a directional coupler provided with a primary line and a plurality of secondary lines.

Patent Document 1 describes a directional coupler provided with a primary line and a plurality of secondary lines. The plurality of secondary lines are disposed so as to extend parallel to the primary line.

With this configuration, each of the plurality of secondary lines is disposed such that the secondary line can be electromagnetically coupled to the primary line with a predetermined degree of coupling.

Patent Document 1: U.S. Pat. No. 10,498,004

BRIEF SUMMARY

However, in an existing directional coupler as illustrated in Patent Document 1, a plurality of secondary lines are also electromagnetically coupled to each other, and a certain coupling capacitance is generated.

Such a coupling capacitance between the plurality of secondary lines may increase insertion loss regarding a radio frequency signal traveling through the primary line.

The present disclosure suppresses coupling between a plurality of secondary lines.

A directional coupler according to the present disclosure includes a primary line disposed in a multilayer body in which a plurality of insulator layers are stacked, and a first secondary line and a second secondary line, which are disposed in the multilayer body and each of which is capable of being electromagnetically coupled to the primary line. The first secondary line and the second secondary line are disposed at different positions in a stacking direction of the plurality of insulator layers. A facing area where the first secondary line and the second secondary line face each other is smaller than a facing area where the first secondary line and the primary line face each other and a facing area where the second secondary line and the primary line face each other.

Moreover, a directional coupler according to the present disclosure includes a primary line disposed in a multilayer body in which a plurality of insulator layers are stacked, and a first secondary line and a second secondary line, which are disposed in the multilayer body and each of which is capable of being electromagnetically coupled to the primary line. The first secondary line and the second secondary line are disposed at different positions in a stacking direction of the plurality of insulator layers. A distance between the first secondary line and the second secondary line is longer than a distance between the first secondary line and the primary line or a distance between the second secondary line and the primary line.

With these configurations, a desired degree of coupling is achieved between the primary line and each of the first secondary line and the second secondary line, and furthermore, the coupling capacitance between the first secondary line and the second secondary line is reduced and suppressed.

According to the present disclosure, coupling between the plurality of secondary lines can be suppressed.

DETAILED DESCRIPTION

First Embodiment

A directional coupler according to a first embodiment of the present disclosure will be described with reference to the drawings.

Example of Structure of Directional Coupler 10

Figure 1:
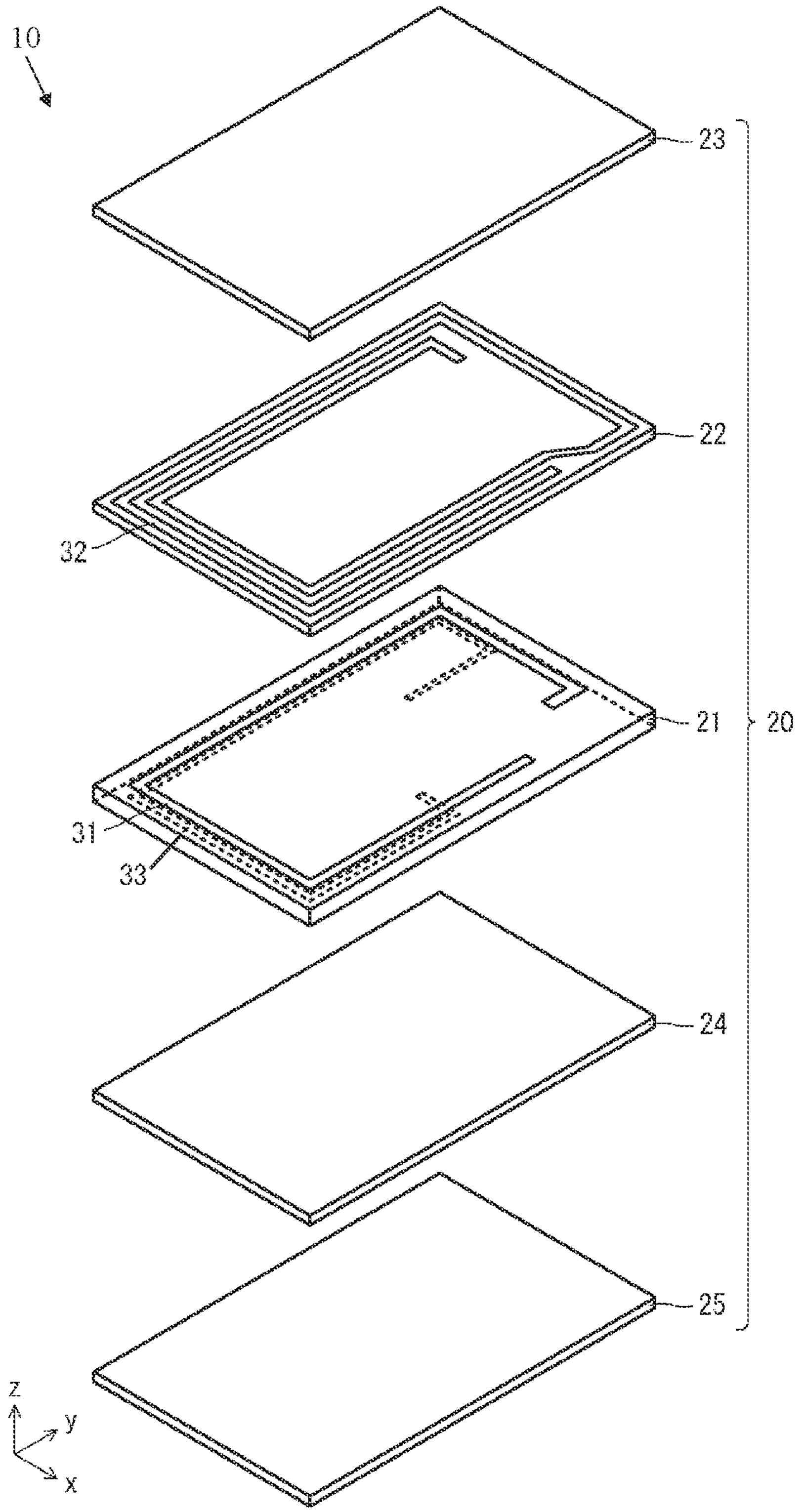
FIG. 1 is an exploded perspective view illustrating the configuration of a directional coupler according to a first embodiment.
Figure 2A:
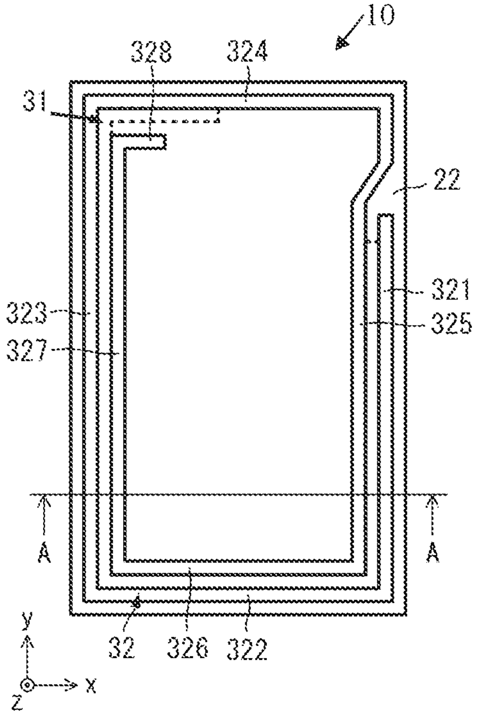
FIGS. 2A, 2B, and 2C are plan views of predetermined layers of a multilayer body according to the first embodiment.
Figure 2B:
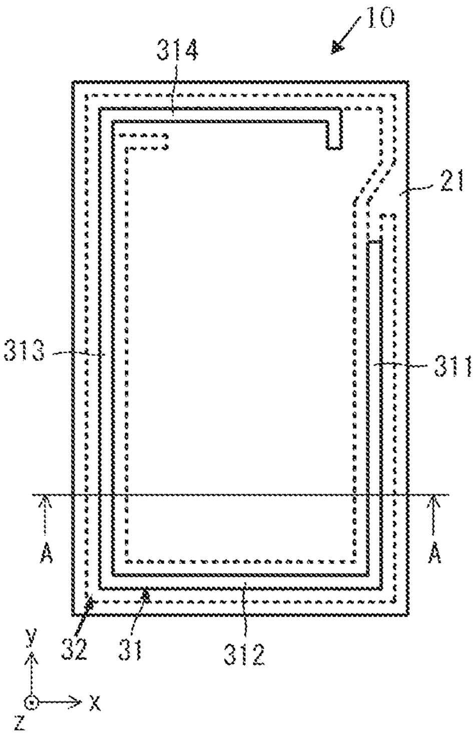
Figure 2C:
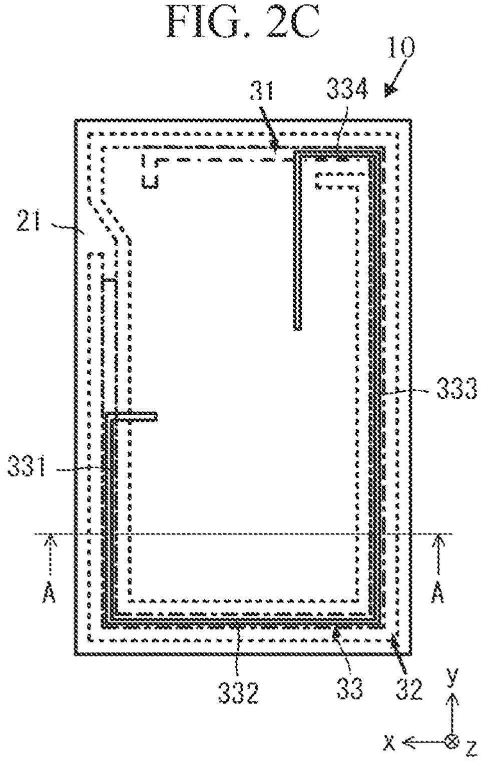
Figure 3:
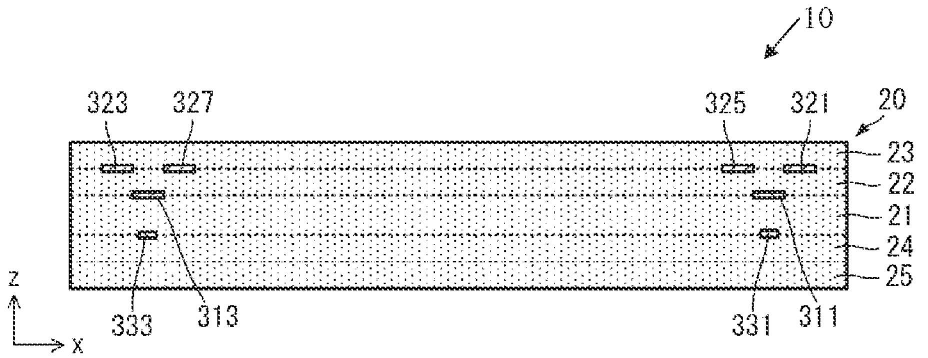
FIG. 3 is a side cross-sectional view illustrating the configuration of the directional coupler according to the first embodiment.

FIG. 1 is an exploded perspective view illustrating the configuration of the directional coupler according to the first embodiment. FIGS. 2A, 2B, and 2C are plan views of predetermined layers of a multilayer body according to the first embodiment. FIG. 3 is a side cross-sectional view illustrating the configuration of the directional coupler according to the first embodiment. FIG. 3 illustrates a cross section taken along A-A of FIGS. 2A and 2B. Note that, in FIGS. 1, 2A, 2B, 2C, and 3, the shapes of individual units are emphasized as appropriate to facilitate understanding of the configurations. Moreover, similarly, the shapes of individual units are emphasized as appropriate also in the drawings for the following embodiments.

As illustrated in FIGS. 1, 2A, 2B, 2C, and 3, the directional coupler 10 has a multilayer body 20, a conductor 31, a conductor 32, and a conductor 33.

The multilayer body 20 includes an insulator layer 21, an insulator layer 22, an insulator layer 23, an insulator layer 24, and an insulator layer 25. That is, the multilayer body 20 has a configuration in which the plurality of insulator layers 21 to 25 are stacked. The plurality of insulator layers 21 to 25 are made of materials having predetermined dielectric constants. Note that, in the present embodiment, the multilayer body 20 is formed by five layers; however, it is sufficient that the multilayer body 20 have at least two layers, which are the insulator layer 21 and the insulator layer 22, and the number of layers be set as appropriate in accordance with the specifications of the directional coupler 10.

On one main surface side of the insulator layer 21, the insulator layer 22 and the insulator layer 23 are stacked in this order. On the other main surface side of the insulator layer 21, the insulator layer 24 and the insulator layer 25 are stacked in this order. For example, the insulator layer 21 is a core material layer, and the insulator layer 22, the insulator layer 23, the insulator layer 24, and the insulator layer 25 are prepreg layers. For example, the multilayer body 20 is formed by stacking the insulator layer 22 and the insulator layer 23 in this order on the one main surface side of the insulator layer 21 made of a core material, stacking the insulator layer 24 and the insulator layer 25 in this order on the other main surface side of the insulator layer 21, and bonding the insulator layers 21 to 25 through thermocompression bonding to each other.

The conductor 31, the conductor 32, and the conductor 33 are, for example, line conductors. The conductor 31, the conductor 32, and the conductor 33 can be realized by, for example, copper or the like. The conductor 31 corresponds to a "primary line" of the present disclosure, and the conductor 32 and the conductor 33 correspond to a "first secondary line" and a "second secondary line" of the present disclosure, respectively.

The conductor 31 is disposed at an interface where the insulator layer 21 and the insulator layer 22 are in contact with each other. The conductor 31 is a conductor that extends so as to have a predetermined shape.

More specifically, the conductor 31 has a wound shape that forms substantially one circuit, and includes, as illustrated in FIG. 2B, a conductor portion 311, a conductor portion 312, a conductor portion 313, and a conductor portion 314. The conductor portion 311, the conductor portion 312, the conductor portion 313, and the conductor portion 314 are connected to each other in this order. Note that a wound shape in the present disclosure does not have to be perfectly annular and is a shape that has at least part of an annular shape. A wound shape in the present disclosure can be a shape that has three or more straight portions and in which these three or more straight portions are connected in series at angles other than 0 degrees (180 degrees). A wound shape in the present disclosure can be a shape that has three or more straight portions and in which two straight portions that are not directly connected to each other among the three or more straight portions are parallel to each other.

The conductor portion 311 and the conductor portion 313 are disposed so as to be spaced apart from each other in the x direction, which is normal to the z direction corresponding to the stacking direction of the plurality of insulator layers 21 to 25 (the thickness direction of the multilayer body 20), and have straight line shapes that extend in the y direction, which is normal to the z direction and the x direction. The conductor portion 312 and the conductor portion 314 are disposed so as to be spaced apart from each other in the y direction and have straight line shapes that extend in the x direction. With these shapes, the conductor 31 having a wound shape that forms substantially one circuit is realized.

The conductor 32 is disposed at an interface where the insulator layer 22 and the insulator layer 23 are in contact with each other. In other words, the conductor 32 is disposed on the opposite side of the insulator layer 22 from the conductor 31.

The conductor 32 has a wound shape that forms substantially two circuits, and includes, as illustrated in FIG. 2A, a conductor portion 321, a conductor portion 322, a conductor portion 323, a conductor portion 324, a conductor portion 325, a conductor portion 326, a conductor portion 327, and a conductor portion 328. The conductor portion 321, the conductor portion 322, the conductor portion 323, the conductor portion 324, the conductor portion 325, the conductor portion 326, the conductor portion 327, and the conductor portion 328 are connected to each other in this order.

The conductor portion 321, the conductor portion 323, the conductor portion 325, and the conductor portion 327 have straight line shapes that extend in the y direction. The conductor portion 321 and the conductor portion 325 are adjacent to each other and extend parallel to each other. The conductor portion 323 and the conductor portion 327 are adjacent to each other and extend parallel to each other. The conductor portion 322, the conductor portion 324, the conductor portion 326, and the conductor portion 328 have straight line shapes that extend in the x direction. The conductor portion 322 and the conductor portion 326 are adjacent to each other and extend parallel to each other. The conductor portion 324 and the conductor portion 328 are adjacent to each other and extend parallel to each other. With these shapes, the conductor 32 having a wound shape that forms substantially two circuits, that is, a wound shape that forms one or more circuits having at least one portion where two conductor portions extend parallel to each other is realized.

The conductor 33 is disposed at an interface where the insulator layer 21 and the insulator layer 24 are in contact with each other. In other words, the conductor 33 is disposed on the opposite side of the insulator layer 21 from the conductor 31. The conductor 33 is a conductor that extends so as to have a predetermined shape.

More specifically, the conductor 33 has a wound shape that forms less than one circuit and includes, as illustrated in FIG. 2C, a conductor portion 331, a conductor portion 332, a conductor portion 333, and a conductor portion 334. The conductor portion 331, the conductor portion 332, the conductor portion 333, and the conductor portion 334 are connected to each other in this order.

The conductor portion 331 and the conductor portion 333 have straight line shapes that extend in the y direction. The conductor portion 312 and the conductor portion 314 have straight line shapes that extend in the x direction. With these shapes, the conductor 33 having a wound shape that forms less than one circuit is realized.

The conductor 31 and the conductor 32 are close to each other and extend parallel to each other. More specifically, the conductor portion 321 and the conductor portion 325 of the conductor 32 are close to and extend parallel to the conductor portion 311 of the conductor 31. The conductor portion 322 and the conductor portion 326 of the conductor 32 are close to and extend parallel to the conductor portion 312 of the conductor 31. The conductor portion 323 and the conductor portion 327 of the conductor 32 are close to and extend parallel to the conductor portion 313 of the conductor 31. The conductor portion 324 and the conductor portion 328 of the conductor 32 are close to and extend parallel to the conductor portion 314 of the conductor 31.

As a result, a certain coupling capacitance is generated between the conductor 31 and the conductor 32, and certain electromagnetic coupling is realized between the conductor 31 and the conductor 32. That is, a certain coupling capacitance is generated between a primary line formed by the conductor 31 and a secondary line formed by the conductor 32, and certain electromagnetic coupling is realized between the primary line formed by the conductor 31 and the secondary line formed by the conductor 32.

The conductor 31 and the conductor 33 are close to each other and extend parallel to each other. More specifically, the conductor portion 331 of the conductor 33 is close to and extends parallel to the conductor portion 311 of the conductor 31. The conductor portion 332 of the conductor 33 is close to and extends parallel to the conductor portion 312 of the conductor 31. The conductor portion 333 of the conductor 33 is close to and extends parallel to the conductor portion 313 of the conductor 31. The conductor portion 334 of the conductor 33 is close to and extends parallel to the conductor portion 314 of the conductor 31.

As a result, a certain coupling capacitance is generated between the conductor 31 and the conductor 33, and certain electromagnetic coupling is realized between the conductor 31 and the conductor 33. That is, a certain coupling capacitance is generated between the primary line formed by the conductor 31 and a secondary line formed by the conductor 33, and certain electromagnetic coupling is realized between the primary line formed by the conductor 31 and the secondary line formed by the conductor 33.

Circuit Configuration of Directional Coupler 10

Figure 4:
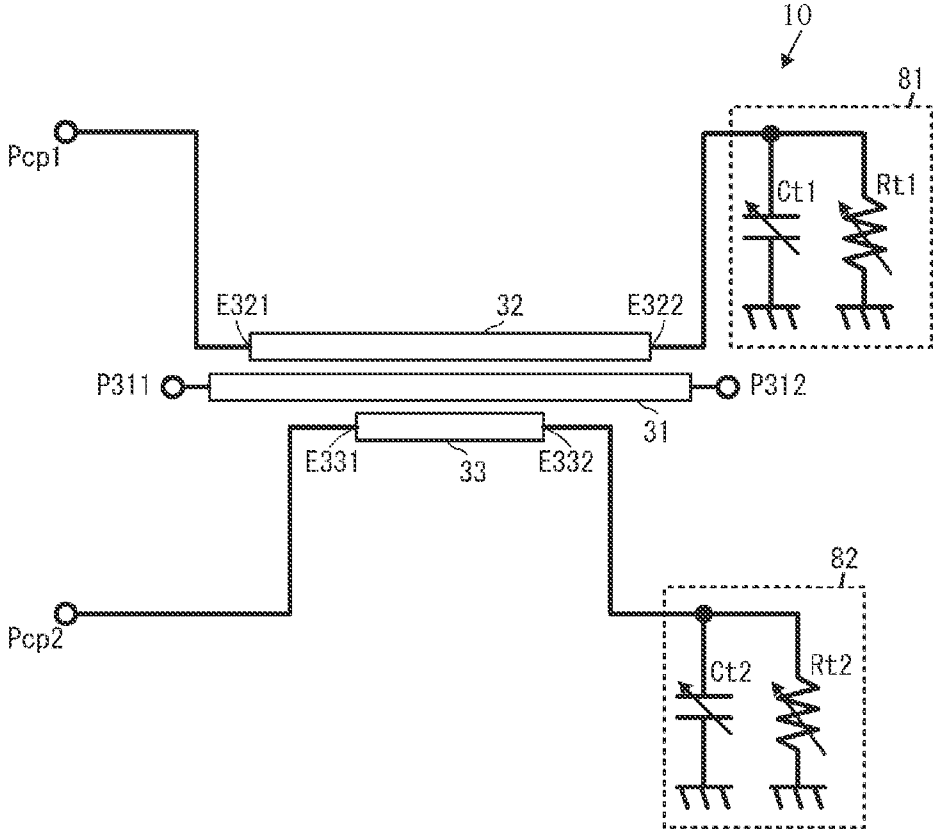
FIG. 4 is an equivalent circuit diagram of the directional coupler according to the first embodiment.

FIG. 4 is an equivalent circuit diagram of the directional coupler according to the first embodiment.

As illustrated in FIG. 4, as a circuit configuration, the directional coupler 10 includes the primary line (the conductor 31), the secondary line (the conductor 32), and the secondary line (the conductor 33). Moreover, the directional coupler 10 includes an input-output terminal P311, an input-output terminal P312, a coupling output terminal Pcp1, a coupling output terminal Pcp2, a termination circuit 81, and a termination circuit 82.

One end of the primary line (the conductor 31) is connected to the input-output terminal P311, and the other end of the primary line (the conductor 31) is connected to the input-output terminal P312.

One end E321 of the secondary line (the conductor 32) is connected to the coupling output terminal Pcp1, and another end E322 of the secondary line (the conductor 32) is connected to the termination circuit 81. The termination circuit 81 includes a parallel circuit formed by a variable resistor Rt1 and a variable capacitor Ct1. The parallel circuit of the termination circuit 81 is connected between the other end E322 of the secondary line (the conductor 32) and a reference potential.

One end E331 of the secondary line (the conductor 33) is connected to the coupling output terminal Pcp2, and another end E332 of the secondary line (the conductor 33) is connected to the termination circuit 82. The termination circuit 82 includes a parallel circuit formed by a variable resistor Rt2 and a variable capacitor Ct2. The parallel circuit of the termination circuit 82 is connected between the other end E332 of the secondary line (the conductor 33) and the reference potential.

The primary line (the conductor 31) and the secondary line (the conductor 32) are disposed such that the primary line (the conductor 31) and the secondary line (the conductor 32) can be electromagnetically coupled to each other. Thus, a radio frequency signal traveling through the primary line (the conductor 31) causes a radio frequency signal to be excited in the secondary line (the conductor 32) in accordance with the degree of coupling, and the excited radio frequency signal is output as a detection signal from the coupling output terminal Pcp1. The frequency of this detection signal is determined by a distance along which the primary line (the conductor 31) and the secondary line (the conductor 32) extend parallel to each other (for example, substantially ¼ of the wavelength of a radio frequency signal to be detected). Note that "lines extending parallel to each other" refers to not only a case where the lines extend side by side while maintaining the same distance therebetween but also a case where the lines extend side by side while maintaining a substantially constant distance therebetween (for example, a case where the lines extend side by side while maintaining a distance that varies within a range of ±10% therebetween). In this case, ±10% as a distance error can be also set as appropriate in accordance with, for example, manufacturing errors or characteristic tolerances.

The primary line (the conductor 31) and the secondary line (the conductor 33) are disposed such that the primary line (the conductor 31) and the secondary line (the conductor 33) can be electromagnetically coupled to each other. Thus, a radio frequency signal traveling through the primary line (the conductor 31) causes a radio frequency signal to be excited in the secondary line (the conductor 33) in accordance with the degree of coupling, and the excited radio frequency signal is output as a detection signal from the coupling output terminal Pcp2. The frequency of this detection signal is determined by a distance along which the primary line (the conductor 31) and the secondary line (the conductor 33) extend parallel to each other (for example, about ¼ of the wavelength of a radio frequency signal to be detected). Note that the definition of "extend parallel to each other" in this case is equivalent to the definition of "extend parallel to each other" described above.

In the directional coupler 10, the distance along which the primary line (the conductor 31) and the secondary line (the conductor 32) extend parallel to each other is longer than the distance along which the primary line (the conductor 31) and the secondary line (the conductor 33) extend parallel to each other. Thus, the frequency of the detection signal output from the coupling output terminal Pcp1 is lower than the frequency of the detection signal output from the coupling output terminal Pcp2. In other words, the directional coupler 10 can output detection signals having a plurality of frequencies.

In the directional coupler 10, the secondary line (the conductor 32) and the secondary line (the conductor 33) are disposed so as to be coupled to the same portion of the primary line (the conductor 31) (see FIG. 4). As a result, the directional coupler 10 can be made more compact than a directional coupler having a configuration in which the plurality of secondary lines are coupled to different portions of the primary line.

More Specific Positional Relationship between Primary Line (Conductor 31), Secondary Line (Conductor 32), and Secondary Line (Conductor 33)

Figure 5:
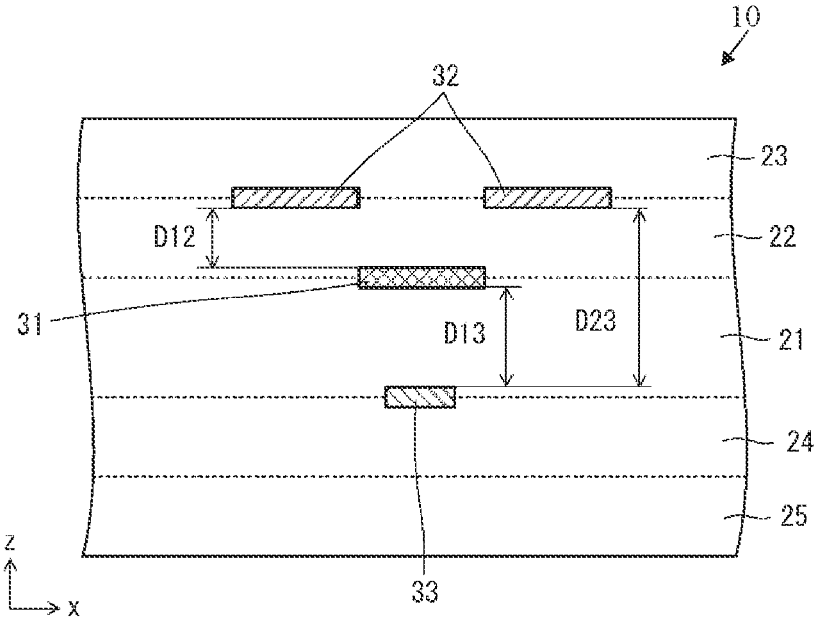
FIG. 5 is a cross-sectional view illustrating part of the directional coupler according to the first embodiment in an enlarged manner.
Figure 6:
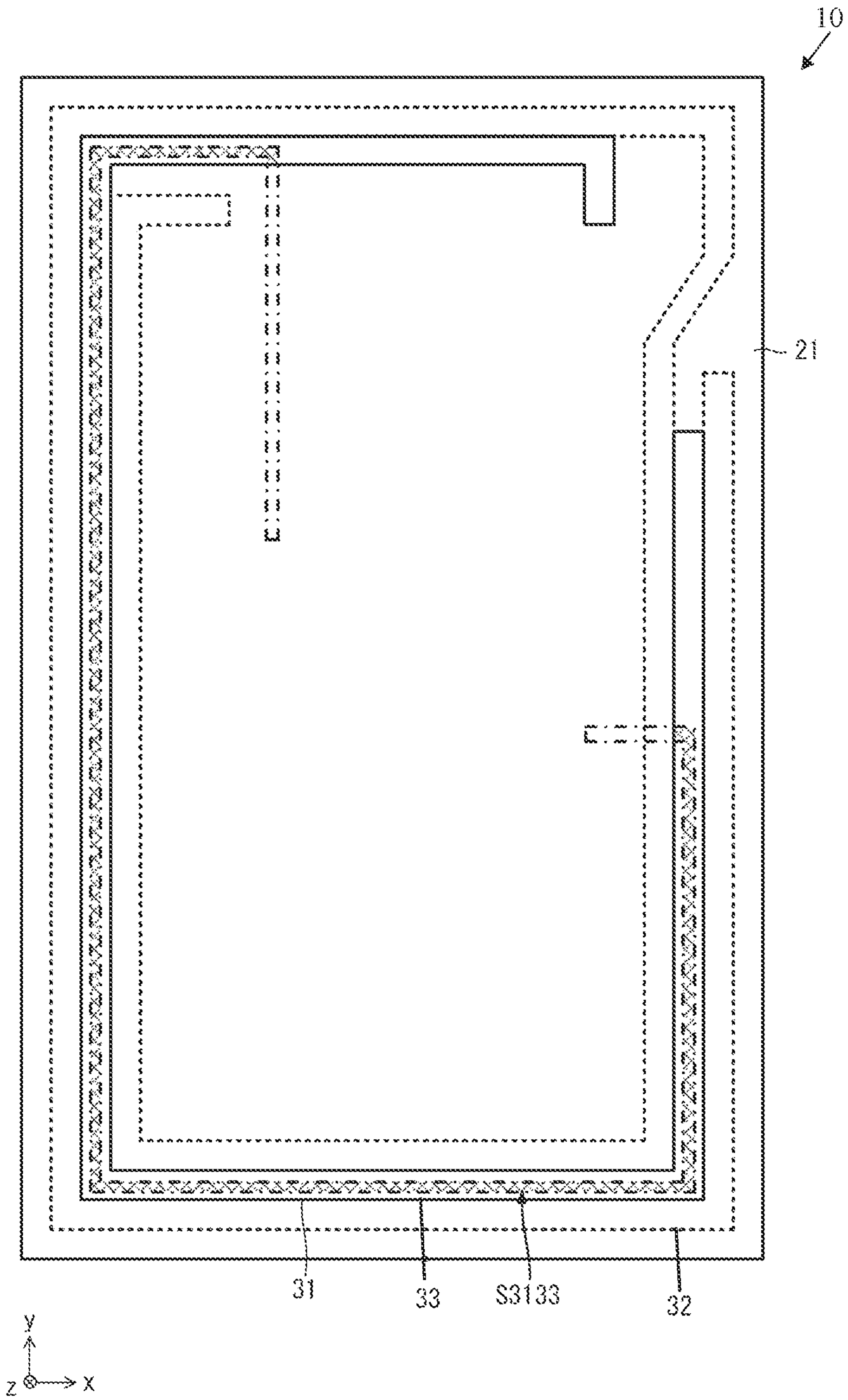
FIG. 6 is a plan view illustrating a facing area.
Figure 7:
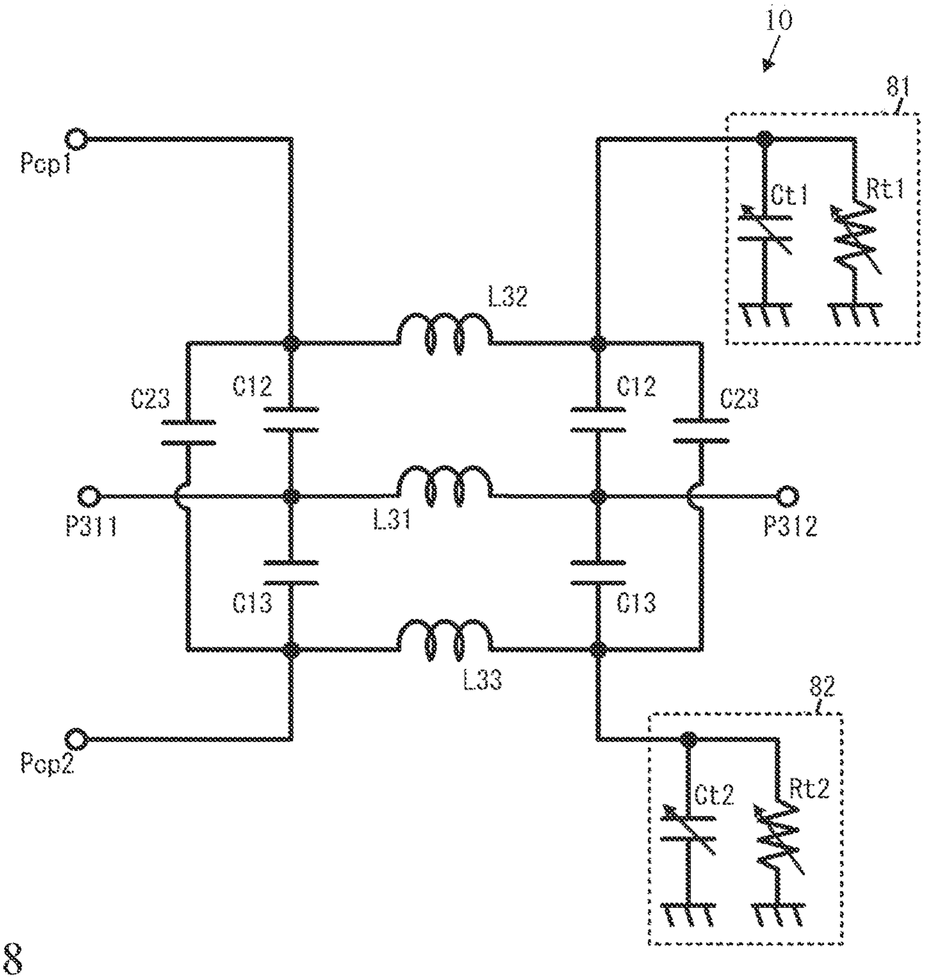
FIG. 7 is an equivalent circuit diagram including a coupling capacitance between conductors of the directional coupler according to the first embodiment.

FIG. 5 is a cross-sectional view illustrating part of the directional coupler according to the first embodiment in an enlarged manner. FIG. 6 is a plan view illustrating a facing area. FIG. 7 is an equivalent circuit diagram including a coupling capacitance between conductors of the directional coupler according to the first embodiment.

As illustrated in FIG. 5, the conductor 32 and the conductor 33 are disposed at different positions from the conductor 31 in the stacking direction of the plurality of insulator layers 21 to 25 (the z direction). Furthermore, the conductor 32 and the conductor 33 are disposed at different positions in the z direction. More specifically, the conductor 32 and the conductor 33 are disposed at positions that sandwich the conductor 31 in the z direction. In other words, the conductor 32 and the conductor 33 are disposed on opposite sides of the conductor 31.

The conductor 31 and the conductor 32 are disposed with a distance D12 therebetween in the z direction. The conductor 31 and the conductor 33 are disposed with a distance D13 therebetween in the z direction. The conductor 32 and the conductor 33 are disposed with a distance D23 therebetween in the z direction.

The distance D12 is as large as the thickness of the insulator layer 22, and the distance D13 is as large as the thickness of the insulator layer 21. The distance D23 is as large as a thickness obtained by adding the thickness of the insulator layer 21 and that of the insulator layer 22. In this manner, the distance D23 is longer than the distance D12 and the distance D13. Thus, a coupling capacitance C23 (see FIG. 7) between the conductor 32 and the conductor 33 is lower than a coupling capacitance C12 (see FIG. 7) between the conductor 31 and the conductor 32 and a coupling capacitance C13 (see FIG. 7) between the conductor 31 and the conductor 33. That is, the degree of electrical coupling between the two secondary lines is lower than the degree of electrical coupling between the primary line and each of the two secondary lines. As a result, the coupling capacitance between the two secondary lines is lower than the coupling capacitance between the primary line and each of the two secondary lines.

In this manner, the distance between the secondary lines is longer than the distance between the primary line and each of the secondary lines, and thus the directional coupler 10 can suppress unnecessary coupling (a coupling capacitance) between the plurality of secondary lines while maintaining electromagnetic coupling between the primary line and each of the plurality of secondary lines at a desired level.

Moreover, in a plan view of the multilayer body 20 (when viewed in the z direction), the conductor 31 and the conductor 33 overlap each other. In other words, the conductor 31 and the conductor 33 face each other. In contrast, the conductor 32 and the conductor 33 do not overlap each other. In other words, the conductor 32 and the conductor 33 do not face each other. As a result, a facing area where the two secondary lines face each other is smaller than a facing area where the primary line and each of the secondary lines face each other. Thus, the coupling capacitance between the two secondary lines is lower than the coupling capacitance between the primary line and each of the two secondary lines.

Note that a facing area in the present disclosure refers to an area where, when viewed in the direction in which two target lines (conductors) are aligned, these target two lines overlap each other. For example, the area of a hatched region S3133 in FIG. 6 corresponds to a facing area where the conductor 31 and the conductor 33 face each other.

In this manner, the facing area where the secondary lines face each other is smaller than the facing area where the primary line and each of the secondary lines face each other, and thus the directional coupler 10 can suppress unnecessary coupling (a coupling capacitance) between the plurality of secondary lines while maintaining electromagnetic coupling between the primary line and each of the plurality of secondary lines at a desired level.

Figure 8:
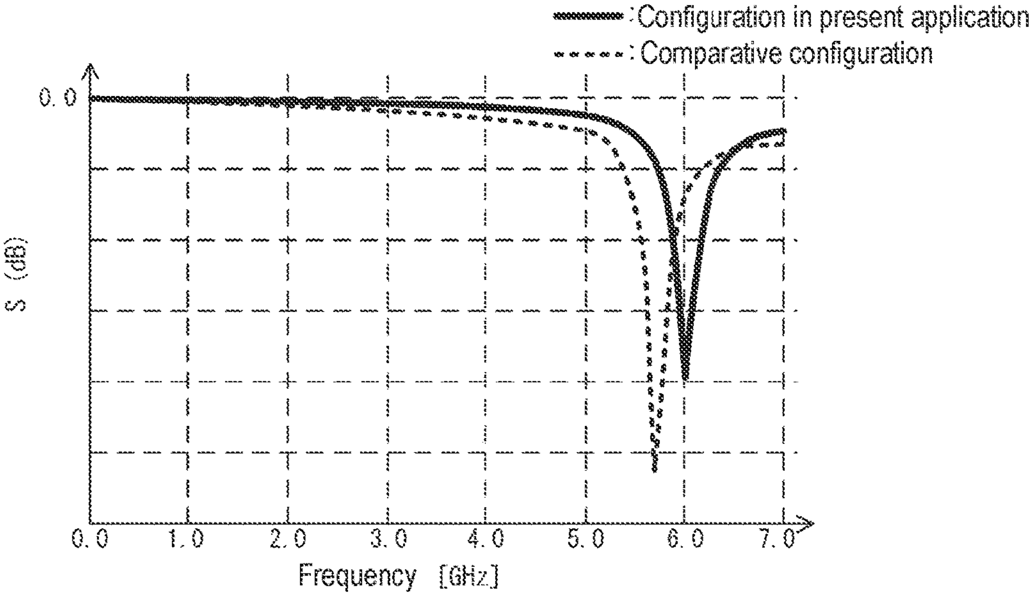
FIG. 8 is a graph illustrating an example of a simulation result of transmission characteristics (S21) of a primary line.

FIG. 8 is a graph illustrating an example of a simulation result of transmission characteristics (S21) of the primary line. In FIG. 8, the solid line represents characteristics of a configuration in the present application, and the broken line represents characteristics of a comparative configuration. The comparative configuration is, for example, a configuration that does not have, as illustrated in Patent Document 1, a relationship between the primary line and the plurality of secondary lines according to the present disclosure.

As described above, the directional coupler 10 includes the plurality of secondary lines, which are the secondary line (the conductor 32) and the secondary line (the conductor 33), extend parallel to the primary line (the conductor 31), and have different lengths from each other. As a result, in the secondary line (the conductor 32), a detection signal of a first frequency band in the frequency band of a radio frequency signal traveling through the primary line (the conductor 31) is obtained. In the secondary line (the conductor 33), a detection signal of a second frequency band in the frequency band of the radio frequency signal traveling through the primary line (the conductor 31) is obtained. The second frequency band is a frequency band higher than the first frequency band. For example, the second frequency band is a frequency band higher than or equal to 1.5 [GHz] and has a predetermined frequency bandwidth. The first frequency band is a frequency band lower than 1.5 [GHz] and has a predetermined frequency bandwidth. Note that the first frequency band and the second frequency band are examples, and frequency bands are not limited to the first and second frequency bands.

In this manner, the directional coupler, which couples the plurality of secondary lines to the primary line, can obtain detection signals regarding radio frequency signals of a wide band. Note that this configuration forms an undesired LC resonant circuit including the coupling capacitance C23 as illustrated in FIG. 7 between the secondary lines. Thus, as illustrated in FIG. 8, an attenuation pole corresponding to the resonant frequency of this LC resonant circuit is generated. Due to this attenuation pole, a frequency band is present in which the insertion loss of the primary line is increased.

However, the coupling capacitance C23 between the secondary lines can be reduced by provision of the configuration of the directional coupler 10. Thus, in the directional coupler 10, the frequency of the attenuation pole can be shifted to the higher frequency side as illustrated by the solid line in FIG. 8. Moreover, an attenuation at the frequency of the attenuation pole can be reduced.

Consequently, a frequency band whose bandpass characteristics are at a desired level becomes wider on the low frequency side of the frequency of the attenuation pole. As a result, the directional coupler 10 can suppress an increase in insertion loss in a wider frequency band and enables a radio frequency signal to travel with low loss in the wider frequency band.

Moreover, in this configuration, the primary line (the conductor 31) is disposed between the secondary line (the conductor 32) and the secondary line (the conductor 33). Thus, the coupling capacitance between the secondary line (the conductor 32) and the secondary line (the conductor 33) is further reduced and suppressed. Thus, the directional coupler 10 can suppress an increase in insertion loss in a wider frequency band and enables a radio frequency signal to travel with low loss in the wider frequency band.

Moreover, in this configuration, the secondary line (the conductor 32) and the secondary line (the conductor 33) are disposed at different positions in the stacking direction of the plurality of insulator layers 21 to 25. As a result, it becomes easier to reduce the planar shape of the directional coupler 10.

Second Embodiment

Figure 9:
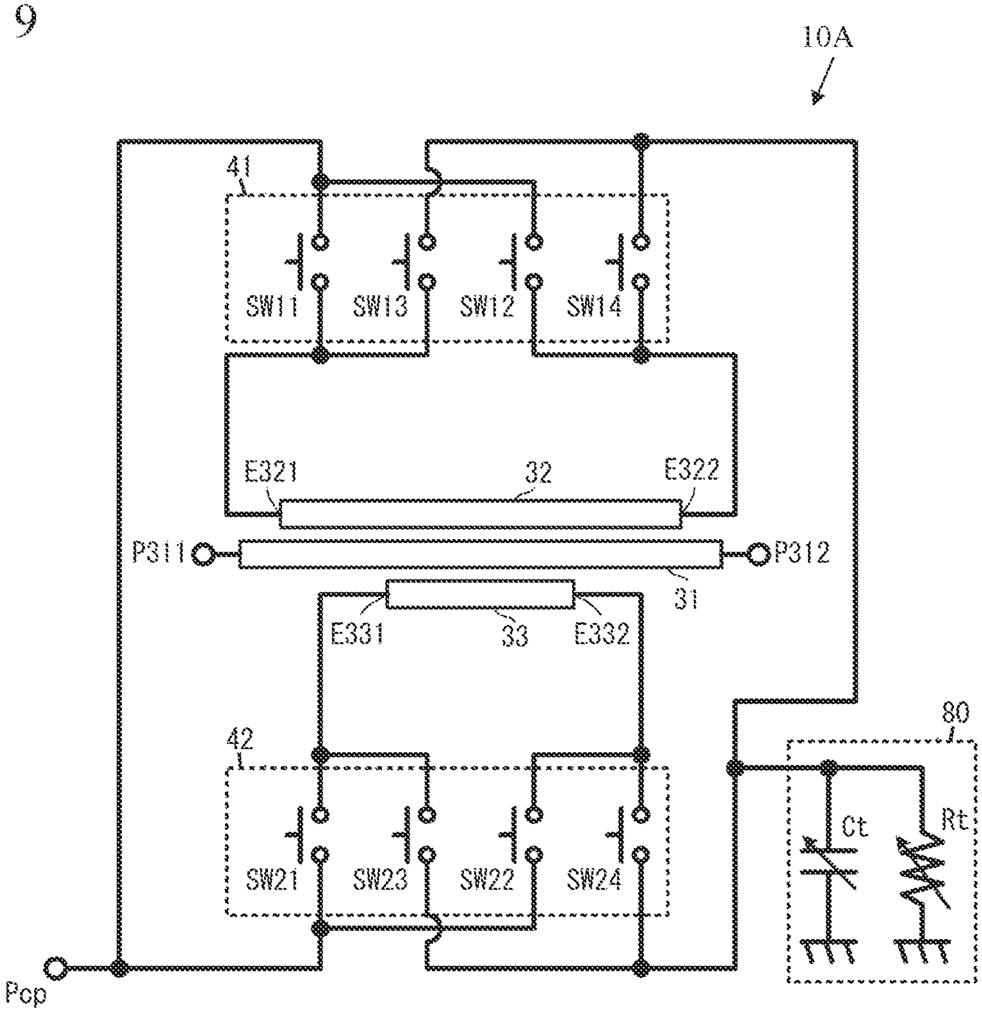
FIG. 9 is an equivalent circuit diagram of a directional coupler according to a second embodiment.

A directional coupler according to a second embodiment of the present disclosure will be described with reference to the drawings. FIG. 9 is an equivalent circuit diagram of the directional coupler according to the second embodiment.

As illustrated in FIG. 9, a directional coupler 10A according to the second embodiment differs from the directional coupler 10 according to the first embodiment in that a switching circuit 41 and a switching circuit 42 are added, and the coupling output terminals and the termination circuits are integrated into a single coupling output terminal and a single termination circuit for the plurality of secondary lines. The rest of the configuration of the directional coupler 10A is substantially the same as that of the directional coupler 10, and description of substantially the same portions will be omitted.

The directional coupler 10A includes the switching circuit 41, the switching circuit 42, a coupling output terminal Pcp, and a termination circuit 80. The switching circuit 41 is connected between the one end E321 and the other end E322 of the secondary line (the conductor 32) and the coupling output terminal Pcp and termination circuit 80. The switching circuit 42 is connected between the one end E331 and the other end E332 of the secondary line (the conductor 33) and the coupling output terminal Pcp and termination circuit 80. The termination circuit 80 includes a parallel circuit formed by a variable resistor Rt and a variable capacitor Ct. This parallel circuit is connected between the reference potential and the switching circuits 41 and 42.

The switching circuit 41 includes a plurality of switching elements (a switching element SW11, a switching element SW12, a switching element SW13, and a switching element SW14). The switching element SW11 is connected between the one end E321 of the secondary line (the conductor 32) and the coupling output terminal Pcp. The switching element SW12 is connected between the other end E322 of the secondary line (the conductor 32) and the coupling output terminal Pcp. The switching element SW13 is connected between the one end E321 of the secondary line (the conductor 32) and the termination circuit 80. The switching element SW14 is connected between the other end E322 of the secondary line (the conductor 32) and the termination circuit 80.

The switching circuit 42 includes a plurality of switching elements (a switching element SW21, a switching element SW22, a switching element SW23, and a switching element SW24). The switching element SW21 is connected between the one end E331 of the secondary line (the conductor 33) and the coupling output terminal Pcp. The switching element SW22 is connected between the other end E332 of the secondary line (the conductor 33) and the coupling output terminal Pcp. The switching element SW23 is connected between the one end E331 of the secondary line (the conductor 33) and the termination circuit 80. The switching element SW24 is connected between the other end E332 of the secondary line (the conductor 33) and the termination circuit 80.

Although details will be omitted, opening and short circuiting of the plurality of switching elements of the switching circuit 41, and opening and conducting of the plurality of switching elements of the switching circuit 42 are controlled by, for example, a control circuit (not illustrated) or the like.

As a result, the directional coupler 10A connects, in a selective manner, the secondary line (the conductor 32) and the secondary line (the conductor 33) to the coupling output terminal Pcp and the termination circuit 80. That is, the directional coupler 10A switches between a first connection mode and a second connection mode. In the first connection mode, the secondary line (the conductor 32) is connected to the coupling output terminal Pcp and the termination circuit 80. In the second connection mode, the secondary line (the conductor 33) is connected to the coupling output terminal Pcp and the termination circuit 80.

Furthermore, the directional coupler 10A switches a connection direction (a first direction mode or a second direction mode) of the secondary line (the conductor 32) and a connection direction (a first direction mode or a second direction mode) of the secondary line (the conductor 33). That is, the directional coupler 10A switches between the first direction mode and the second direction mode for the secondary line (the conductor 32). In the first direction mode, the one end E321 of the secondary line (the conductor 32) is connected to the coupling output terminal Pcp, and the other end E322 of the secondary line (the conductor 32) is connected to the termination circuit. In the second direction mode, the other end E322 of the secondary line (the conductor 32) is connected to the coupling output terminal Pcp, and the one end E321 of the secondary line (the conductor 32) is connected to the termination circuit. Moreover, the directional coupler 10A switches between the first direction mode and the second direction mode for the secondary line (the conductor 33). In the first direction mode, the one end E331 of the secondary line (the conductor 33) is connected to the coupling output terminal Pcp, and the other end E332 of the secondary line (the conductor 33) is connected to the termination circuit. In the second direction mode, the other end E332 of the secondary line (the conductor 33) is connected to the coupling output terminal Pcp, and the one end E331 of the secondary line (the conductor 33) is connected to the termination circuit. In other words, the switching circuits 41 and 42 each switch between the first direction mode and the second direction mode. In the first direction mode, among the secondary line (the conductor 32) and the secondary line (the conductor 33), one end of a selected secondary line to be connected to the coupling output terminal Pcp and the termination circuit 80 is connected to the coupling output terminal Pcp, and the other end of the selected secondary line is connected to the termination circuit 80. In the second direction mode, among the secondary line (the conductor 32) and the secondary line (the conductor 33), one end of a selected secondary line is connected to the termination circuit 80, and the other end of the selected secondary line is connected to the coupling output terminal Pcp.

With such a configuration, the directional coupler 10A can have a single coupling output terminal and a single termination circuit. Moreover, the directional coupler 10A can output detection signals regarding radio frequency signals traveling through the primary line (the conductor 31) in both directions. That is, the directional coupler 10A can output, in a selective manner, detections signals regarding a radio frequency signal traveling through the primary line (the conductor 31) from the input-output terminal P311 to the input-output terminal P312 and a radio frequency signal traveling through the primary line (the conductor 31) from the input-output terminal P312 to the input-output terminal P311 (a reflected signal of the radio frequency signal traveling through the primary line (the conductor 31) from the input-output terminal P311 to the input-output terminal P312).

In this case, each of the switching elements included in the switching circuit 41 and the switching circuit 42 has a capacitive component in an open state. This capacitive component contributes to the capacitive characteristic of the above-described LC resonant circuit and affects so as to lower the frequency of the attenuation pole.

However, the directional coupler 10A has substantially the same configuration regarding the primary line (the conductor 31), the secondary line (the conductor 32), and the secondary line (the conductor 33) as the directional coupler 10 described above. Thus, a reduction in the frequency of the attenuation pole can be suppressed. That is, the above-described structure of the primary line (the conductor 31), the secondary line (the conductor 32), and the secondary line (the conductor 33) is more effective for a configuration including a plurality of switching elements as in the directional coupler 10A. The directional coupler 10A with the above-described structure of the primary line (the conductor 31), the secondary line (the conductor 32), and the secondary line (the conductor 33) can suppress an increase in insertion loss in a wide frequency band and enables a radio frequency signal to travel with low loss in the wide frequency band.

Third Embodiment

Figure 10:
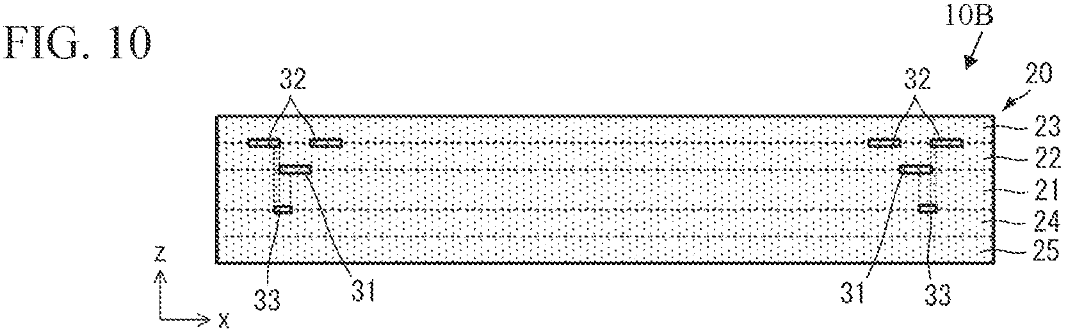
FIG. 10 is a side cross-sectional view illustrating the configuration of a directional coupler according to a third embodiment.

A directional coupler according to a third embodiment of the present disclosure will be described with reference to the drawings. FIG. 10 is a side cross-sectional view illustrating the configuration of the directional coupler according to the third embodiment.

As illustrated in FIG. 10, a directional coupler 10B according to the third embodiment differs from the directional coupler 10 according to the first embodiment in terms of the installation position of the secondary line (the conductor 33). The rest of the configuration of the directional coupler 10B is substantially the same as that of the directional coupler 10, and description of substantially the same portions will be omitted.

In the directional coupler 10B, the secondary line (the conductor 33) and the secondary line (the conductor 32) partially overlap each other in a plan view and face each other. The secondary line (the conductor 33) and the primary line (the conductor 31) partially overlap each other in a plan view and face each other.

A facing area where the secondary line (the conductor 33) and the secondary line (the conductor 32) face each other is smaller than a facing area where the secondary line (the conductor 33) and the primary line (the conductor 31) face each other. As a result, the coupling capacitance between the secondary line (the conductor 33) and the secondary line (the conductor 32) is reduced.

Moreover, also in this configuration, the distance between the secondary line (the conductor 33) and the secondary line (the conductor 32) is longer than the distance between the secondary line (the conductor 33) and the primary line (the conductor 31) and the distance between the secondary line (the conductor 32) and the primary line (the conductor 31). As a result, the coupling capacitance between the secondary line (the conductor 33) and the secondary line (the conductor 32) is further reduced.

In this manner, even in a case where the secondary line (the conductor 33) and the secondary line (the conductor 32) face each other, the directional coupler 10B enables the coupling capacitance between the plurality of secondary lines to be reduced when the above-described relationships are maintained. Thus, the directional coupler 10B can suppress an increase in insertion loss in a wide frequency band and enables a radio frequency signal to travel with low loss in the wide frequency band.

Fourth Embodiment

Figure 11:
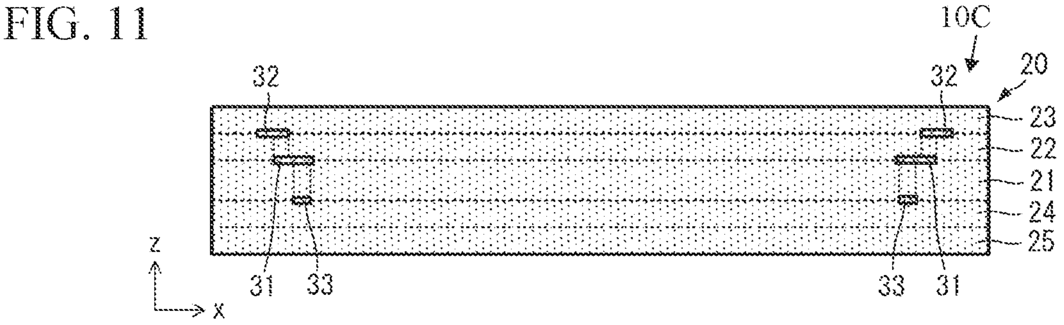
FIG. 11 is a side cross-sectional view illustrating the configuration of a directional coupler according to a fourth embodiment.

A directional coupler according to a fourth embodiment of the present disclosure will be described with reference to the drawings. FIG. 11 is a side cross-sectional view illustrating the configuration of the directional coupler according to the fourth embodiment.

As illustrated in FIG. 11, a directional coupler 10C according to the fourth embodiment differs from the directional coupler 10 according to the first embodiment in terms of the installation positions of the secondary line (the conductor 32) and the secondary line (the conductor 33) with respect to the primary line (the conductor 31). The rest of the configuration of the directional coupler 10C is substantially the same as that of the directional coupler 10, and description of substantially the same portions will be omitted.

In the directional coupler 10C, the primary line (the conductor 31) and the secondary line (the conductor 32) partially overlap each other in a plan view and face each other. The secondary line (the conductor 32) and the secondary line (the conductor 33) do not overlap each other in a plan view and do not face each other.

With this configuration, in the directional coupler 10C, a facing area where the secondary line (the conductor 32) and the secondary line (the conductor 33) face each other is smaller than a facing area where the primary line (the conductor 31) and the secondary line (the conductor 32) face each other and a facing area where the primary line (the conductor 31) and the secondary line (the conductor 33) face each other. Thus, the directional coupler 10C enables the coupling capacitance between the plurality of secondary lines to be reduced.

Moreover, in this configuration, the secondary line (the conductor 32) faces the primary line (the conductor 31) in an outer periphery side region of the primary line (the conductor 31). The secondary line (the conductor 33) faces the primary line (the conductor 31) in an inner periphery side region of the primary line (the conductor 31). As a result, the coupling capacitance between the secondary line (the conductor 32) and the secondary line (the conductor 33) is further reduced and suppressed. Thus, the directional coupler 10C can suppress an increase in insertion loss in a wider frequency band and enables a radio frequency signal to travel with low loss in the wider frequency band.

Fifth Embodiment

Figure 12:
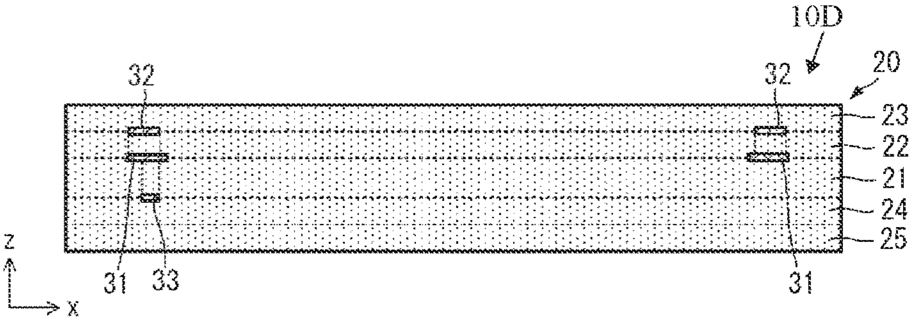
FIG. 12 is a side cross-sectional view illustrating the configuration of a directional coupler according to a fifth embodiment.

A directional coupler according to a fifth embodiment of the present disclosure will be described with reference to the drawings. FIG. 12 is a side cross-sectional view illustrating the configuration of the directional coupler according to the fifth embodiment.

As illustrated in FIG. 12, a directional coupler 10D according to the fifth embodiment differs from the directional coupler 10 according to the first embodiment in terms of the installation positions of the secondary line (the conductor 32) and the secondary line (the conductor 33) with respect to the primary line (the conductor 31). The rest of the configuration of the directional coupler 10D is substantially the same as that of the directional coupler 10, and description of substantially the same portions will be omitted.

The directional coupler 10D has a portion (a left side portion of FIG. 11) in which the primary line (the conductor 31), the secondary line (the conductor 32), and the secondary line (the conductor 33) are disposed in the stacking direction in the order of the secondary line (the conductor 33), the primary line (the conductor 31), and the secondary line (the conductor 32) and overlap one another in a plan view. The directional coupler 10D has a portion (where the secondary line (the conductor 33) is absent (a right side portion of FIG. 11)) in which the primary line (the conductor 31) and the secondary line (the conductor 32) are disposed in the order of the primary line (the conductor 31) and the secondary line (the conductor 32) and overlap each other.

In the portion where the secondary line (the conductor 33), the primary line (the conductor 31), and the secondary line (the conductor 32) overlap one another in a plan view, the secondary line (the conductor 33) and the primary line (the conductor 31) face each other, and the secondary line (the conductor 32) and the primary line (the conductor 31) face each other. The secondary line (the conductor 33) and the secondary line (the conductor 32) are disposed so as to sandwich the primary line (the conductor 31), so that the secondary line (the conductor 33) and the secondary line (the conductor 32) do not directly face each other, and the distance between the secondary lines is long. Thus, the coupling capacitance between the secondary line (the conductor 33) and the secondary line (the conductor 32) is lower than the coupling capacitance between the secondary line (the conductor 33) and the primary line (the conductor 31) and the coupling capacitance between the secondary line (the conductor 32) and the primary line (the conductor 31).

In the portion where the secondary line (the conductor 33) is not disposed, the secondary line (the conductor 32) and the primary line (the conductor 31) face each other, but the secondary line (the conductor 33) and the secondary line (the conductor 32) do not face each other, as a matter of course.

Thus, even with this configuration, when the portion where the secondary line (the conductor 32) and the secondary line (the conductor 33) face the primary line (the conductor 31) has the above-described relationships regarding the facing areas, distances, and capacitances, the directional coupler 10D enables the coupling capacitance between the secondary line (the conductor 32) and the secondary line (the conductor 33) to be reduced.

Sixth Embodiment

Figure 13:
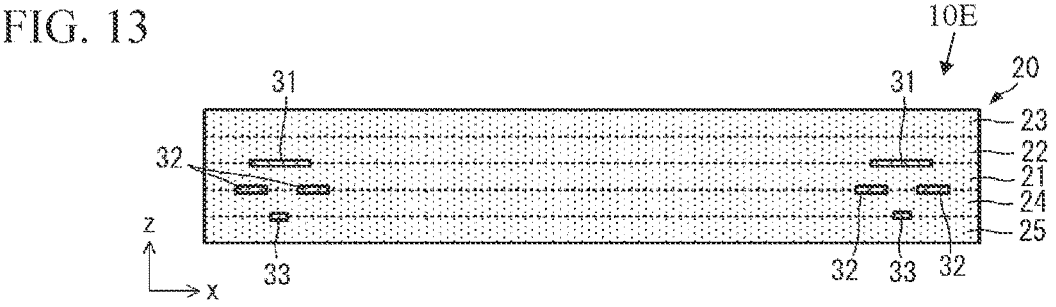
FIG. 13 is a side cross-sectional view illustrating the configuration of a directional coupler according to a sixth embodiment.

A directional coupler according to a sixth embodiment of the present disclosure will be described with reference to the drawings. FIG. 13 is a side cross-sectional view illustrating the configuration of the directional coupler according to the sixth embodiment.

As illustrated in FIG. 13, a directional coupler 10E according to the sixth embodiment differs from the directional coupler 10 according to the first embodiment in terms of the installation positions of the secondary line (the conductor 32) and the secondary line (the conductor 33) with respect to the primary line (the conductor 31). The rest of the configuration of the directional coupler 10E is substantially the same as that of the directional coupler 10, and description of substantially the same portions will be omitted.

In the directional coupler 10E, the secondary line (the conductor 32) and the secondary line (the conductor 33) are disposed on the same side of the primary line (the conductor 31) in the stacking direction of the plurality of insulator layers 21 to 25 (the z direction).

The secondary line (the conductor 32) is disposed closer to the primary line (the conductor 31) than the secondary line (the conductor 33) is in the z direction. The secondary line (the conductor 32) and the primary line (the conductor 31) partially overlap each other in a plan view and face each other.

The secondary line (the conductor 33) and the primary line (the conductor 31) overlap each other in a plan view and face each other. The secondary line (the conductor 32) and the secondary line (the conductor 33) do not overlap each other and do not face each other.

With such a configuration, in the directional coupler 10E, a facing area where the secondary line (the conductor 32) and the secondary line (the conductor 33) face each other is smaller than a facing area where the primary line (the conductor 31) and each of the plurality of secondary lines (the conductor 32, the conductor 33) face each other. Thus, the directional coupler 10E enables the coupling capacitance between the plurality of secondary lines to be reduced.

Moreover, in this configuration, the secondary line (the conductor 32) and the secondary line (the conductor 33) are disposed at different positions in the z direction and are not formed in or on the same layer. As a result, without necessarily increasing the lateral size of the multilayer body (the direction normal to the z direction), the distance between the secondary line (the conductor 32) and the secondary line (the conductor 33) can be increased. As a result, the coupling capacitance between the secondary line (the conductor 32) and the secondary line (the conductor 33) is further reduced and suppressed.

Seventh Embodiment

Figure 14:
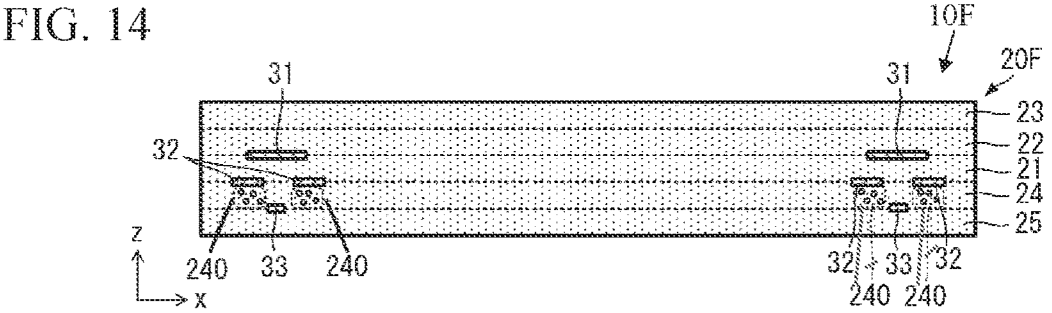
FIG. 14 is a side cross-sectional view illustrating the configuration of a directional coupler according to a seventh embodiment.

A directional coupler according to a seventh embodiment of the present disclosure will be described with reference to the drawings. FIG. 14 is a side cross-sectional view illustrating the configuration of the directional coupler according to the seventh embodiment.

As illustrated in FIG. 14, a directional coupler 10F according to the seventh embodiment differs from the directional coupler 10E according to the sixth embodiment in that the directional coupler 10F according to the seventh embodiment includes a low dielectric constant portion 240. The rest of the configuration of the directional coupler 10F is substantially the same as that of the directional coupler 10E, and description of substantially the same portions will be omitted.

The directional coupler 10F has a multilayer body 20F. The multilayer body 20F includes, in some areas, low dielectric constant portions 240. The low dielectric constant portions 240 have a lower effective dielectric constant than the rest of the multilayer body 20F. The low dielectric constant portions 240 can be realized by, for example, providing an insulator layer with cavities or the like.

The low dielectric constant portions 240 are disposed in the insulator layer 24 of the multilayer body 20F. More specifically, the low dielectric constant portions 240 are disposed on the secondary line (the conductor 33) side of the secondary line (the conductor 32). That is, the low dielectric constant portions 240 are disposed at positions between the secondary line (the conductor 32) and the secondary line (the conductor 33) in the z direction.

With this configuration, the coupling capacitance between the secondary line (the conductor 32) and the secondary line (the conductor 33) is reduced and suppressed. Thus, the directional coupler 10F enables the coupling capacitance between the plurality of secondary lines to be reduced.

Note that, in this case, it is preferable that the low dielectric constant portions 240 do not overlap the region where the secondary line (the conductor 33) and the primary line (the conductor 31) face each other. As a result, the degree of coupling between the secondary line (the conductor 33) and the primary line (the conductor 31) can easily reach a desired level.

Eighth Embodiment

Figure 15A:
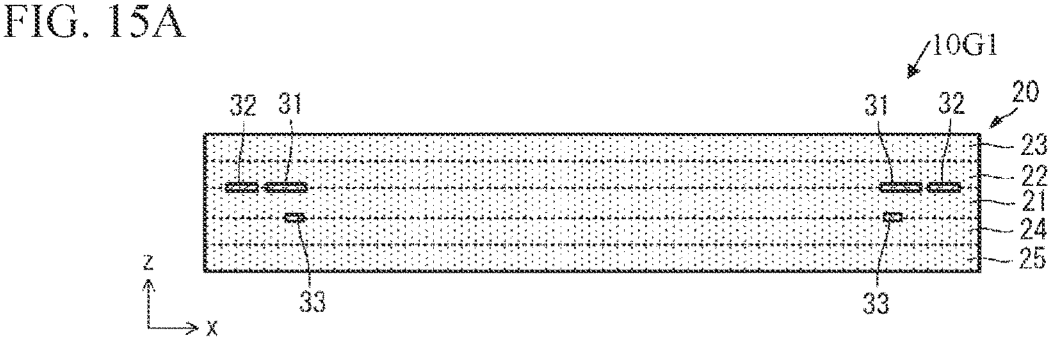
FIGS. 15A and 15B are side cross-sectional views illustrating the configurations of directional couplers according to an eighth embodiment.
Figure 15B:
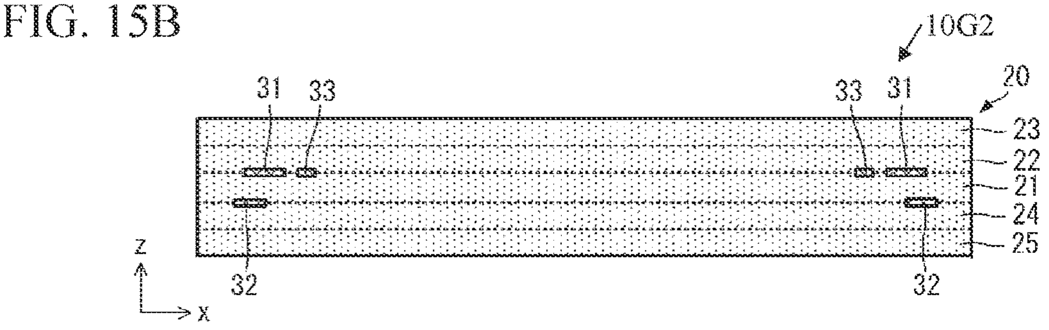

Directional couplers according to an eighth embodiment of the present disclosure will be described with reference to the drawings. FIGS. 15A and 15B are side cross-sectional views illustrating the configurations of the directional couplers according to the eighth embodiment.

As illustrated in FIGS. 15A and 15B, directional couplers 10G1 and 10G2 according to the eighth embodiment differ from the directional coupler 10 according to the first embodiment in terms of the installation positions of the secondary line (the conductor 32) and the secondary line (the conductor 33) with respect to the primary line (the conductor 31). The rests of the configurations of the directional couplers 10G1 and 10G2 are substantially the same as that of the directional coupler 10, and description of substantially the same portions will be omitted.

As illustrated in FIG. 15A, in the directional coupler 10G1, the primary line (the conductor 31) and the secondary line (the conductor 32) are disposed in or on the same layer in the stacking direction of the plurality of insulator layers 21 to 25 (the z direction). As a result, a conductor side surface (a surface extending in the stacking direction of the plurality of insulator layers 21 to 25) of the primary line (the conductor 31) and that of the secondary line (the conductor 32) face each other.

The secondary line (the conductor 33) is disposed in or on a different layer from the primary line (the conductor 31) and the secondary line (the conductor 32). The secondary line (the conductor 33) overlaps, in a plan view, and faces the primary line (the conductor 31). The secondary line (the conductor 33) does not overlap, in a plan view, or face the secondary line (the conductor 32).

With such a configuration, in the directional coupler 10G1, a facing area where the secondary line (the conductor 32) and the secondary line (the conductor 33) face each other is smaller than a facing area where the primary line (the conductor 31) and each of the plurality of secondary lines (the conductor 32, the conductor 33) face each other. Thus, the directional coupler 10G1 enables the coupling capacitance between the plurality of secondary lines to be reduced.

As illustrated in FIG. 15B, in the directional coupler 10G2, the primary line (the conductor 31) and the secondary line (the conductor 33) are disposed in or on the same layer in the stacking direction of the plurality of insulator layers 21 to 25 (the z direction). As a result, a conductor side surface of the primary line (the conductor 31) and that of the secondary line (the conductor 33) face each other.

The secondary line (the conductor 32) is disposed in or on a different layer from the primary line (the conductor 31) and the secondary line (the conductor 33). The secondary line (the conductor 32) overlaps, in a plan view, and faces the primary line (the conductor 31). The secondary line (the conductor 32) does not overlap, in a plan view, or face the secondary line (the conductor 33).

With such a configuration, in the directional coupler 10G2, a facing area where the secondary line (the conductor 32) and the secondary line (the conductor 33) face each other is smaller than a facing area where the primary line (the conductor 31) and each of the plurality of secondary lines (the conductor 32, the conductor 33) face each other. Thus, the directional coupler 10G2 enables the coupling capacitance between the plurality of secondary lines to be reduced.

Moreover, with this configuration, three kinds of conductor are disposed in or on two layers, and thus the number of insulator layers stacked in the multilayer body can be reduced although illustration is omitted. As a result, the directional couplers 10G1 and 10G2 can be made thinner.

Ninth Embodiment

Figure 16:
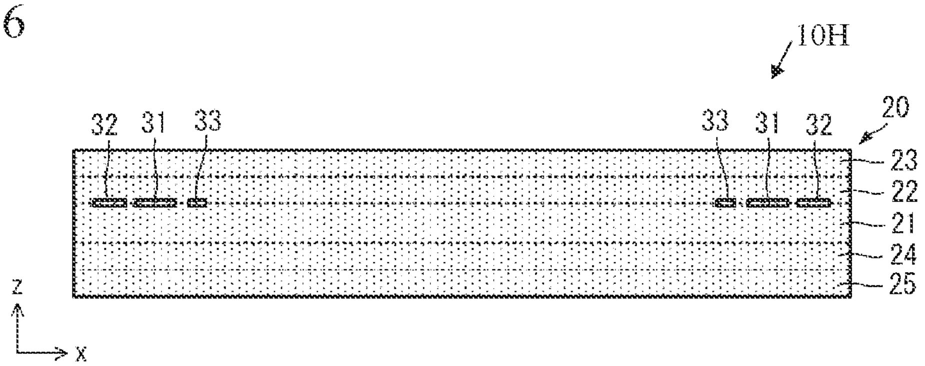
FIG. 16 is a side cross-sectional view illustrating the configuration of a directional coupler according to a ninth embodiment.

A directional coupler according to a ninth embodiment of the present disclosure will be described with reference to the drawings. FIG. 16 is a side cross-sectional view illustrating the configuration of the directional coupler according to the ninth embodiment.

As illustrated in FIG. 16, a directional coupler 10H according to the ninth embodiment differs from the directional coupler 10 according to the first embodiment in terms of the installation positions of the secondary line (the conductor 32) and the secondary line (the conductor 33) with respect to the primary line (the conductor 31). The rest of the configuration of the directional coupler 10H is substantially the same as that of the directional coupler 10, and description of substantially the same portions will be omitted.

As illustrated in FIG. 16, in the directional coupler 10H, the primary line (the conductor 31), the secondary line (the conductor 32), and the secondary line (the conductor 33) are disposed in or on the same layer in the stacking direction of the plurality of insulator layers 21 to 25 (the z direction). In this case, the secondary line (the conductor 32) and the secondary line (the conductor 33) are disposed so as to sandwich the primary line (the conductor 31). As a result, a conductor side surface of the primary line (the conductor 31) and that of the secondary line (the conductor 32) face each other, and a conductor side surface of the primary line (the conductor 31) and that of the secondary line (the conductor 33) face each other. The secondary line (the conductor 32) and the secondary line (the conductor 33) overlap each other in a side view; however, the primary line (the conductor 31) is disposed between the secondary line (the conductor 32) and the secondary line (the conductor 33), and thus the secondary line (the conductor 32) and the secondary line (the conductor 33) do not directly face each other.

With such a configuration, in the directional coupler 10H, the coupling capacitance between the plurality of secondary lines (the conductor 32, the conductor 33) can be made lower than the coupling capacitance between the primary line (the conductor 31) and each of the plurality of secondary lines (the conductor 32, the conductor 33).

Moreover, with this configuration, three kinds of conductor are disposed in one layer, and thus the number of insulator layers stacked in the multilayer body can be reduced although illustration is omitted. As a result, the directional coupler 10H can be made thinner.

Note that the configurations of the above-described embodiments and the configurations of examples derived from the embodiments can be combined as appropriate, and operational effects corresponding to the individual combinations can be obtained.

REFERENCE SIGNS LIST

10, 10A, 10B, 10C, 10D, 10E, 10F, 10G1, 10G2, 10H: directional coupler
20, 20F: multilayer body
21, 22, 23, 24, 25: insulator layer
31, 32, 33: conductor
41, 42: switching circuit
80, 81, 82: termination circuit
240: low dielectric constant portion
311, 312, 313, 314, 321, 322, 323, 324, 325, 326, 327, 328, 331, 332, 333, 334: conductor portion
C12, C13, C23: coupling capacitance
Ct, Ct1, Ct2: variable capacitor
D12, D13, D23: distance
E321: one end
E322: another end
E331: one end
E332: another end
P311, P312: input-output terminal
Pcp, Pcp1, Pcp2: coupling output terminal
Rt, Rt1, Rt2: variable resistor
SW11, SW12, SW13, SW14, SW21, SW22, SW23, SW24: switching element

The invention claimed is:

1. A directional coupler comprising:
a multilayer body comprising a plurality of insulator layers that are stacked;
a primary line in the multilayer body; and
a first secondary line and a second secondary line, which are in the multilayer body and each of which is electromagnetically coupled to the primary line,
wherein
the first secondary line and the second secondary line are at different positions in a stacking direction of the plurality of insulator layers, and
a first facing area, where the first secondary line and the second secondary line face each other, is smaller than a second facing area where the first secondary line and the primary line face each other and a third facing area where the second secondary line and the primary line face each other.

2. The directional coupler according to claim 1,
wherein the first secondary line and the second secondary line do not face each other.

3. The directional coupler according to claim 2, wherein the first secondary line and the second secondary line are at positions that sandwich the primary line in the stacking direction of the plurality of insulator layers.

4. The directional coupler according to claim 1,
wherein the first secondary line and the second secondary line are at positions that sandwich the primary line in the stacking direction of the plurality of insulator layers.

5. The directional coupler according to claim 1, wherein in the stacking direction of the plurality of insulator layers, the first secondary line and the second secondary line are on a same side of the primary line.

6. The directional coupler according to claim 1, further comprising:
a coupling output terminal and a termination circuit, which are connected to the first secondary line and the second secondary line; and
a first switching circuit connected between the first secondary line and the coupling output terminal and termination circuit and a second switching circuit connected between the second secondary line and the coupling output terminal and termination circuit.

7. The directional coupler according to claim 6, wherein the first and second switching circuits are configured to selectively switch between
a first connection mode, in which the first secondary line is connected to the coupling output terminal and the termination circuit, and
a second connection mode, in which the second secondary line is connected to the coupling output terminal and the termination circuit.

8. The directional coupler according to claim 7, wherein the first and second switching circuits are further configured to selectively switch between
a first direction mode, in which, among the first secondary line and the second secondary line, a first end of a selected secondary line to be connected to the coupling output terminal and the termination circuit is connected to the coupling output terminal, and a second end of the selected secondary line is connected to the termination circuit, and
a second direction mode, in which the first end of the selected secondary line is connected to the termination circuit, and the second end of the selected secondary line is connected to the coupling output terminal.

9. The directional coupler according to claim 6, wherein the first and second switching circuits comprise a plurality of switching elements.

10. A directional coupler comprising:
a multilayer body comprising a plurality of insulator layers that are stacked;
a primary line in the multilayer body; and
a first secondary line and a second secondary line, which are in the multilayer body and each of which is electromagnetically coupled to the primary line,
wherein
the first secondary line and the second secondary line are at different positions in a stacking direction of the plurality of insulator layers,
a first distance between the first secondary line and the second secondary line is longer than a second distance between the first secondary line and the primary line and a third distance between the second secondary line and the primary line, and
the first secondary line and the second secondary line are insulated from each other within the multilayer body.

11. The directional coupler according to claim 10,
wherein the first, second, and third distances comprise distances along the stacking direction of the plurality of insulator layers.

12. The directional coupler according to claim 11, wherein the first secondary line and the second secondary line are at positions that sandwich the primary line in the stacking direction of the plurality of insulator layers.

13. The directional coupler according to claim 10, wherein the first, second, and third distances comprises distances along a direction normal to the stacking direction of the plurality of insulator layers.

14. The directional coupler according to claim 13, wherein the first secondary line and the second secondary line are at positions that sandwich the primary line in the stacking direction of the plurality of insulator layers.

15. The directional coupler according to claim 10, wherein the first secondary line and the second secondary line are at positions that sandwich the primary line in the stacking direction of the plurality of insulator layers.

16. The directional coupler according to claim 10, wherein in the stacking direction of the plurality of insulator layers, the first secondary line and the second secondary line are on a same side of the primary line.

17. A directional coupler comprising:

a multilayer body comprising a plurality of insulator layers that are stacked;

a primary line in the multilayer body; and a first secondary line and a second secondary line, which are in the multilayer body and each of which is electromagnetically coupled to the primary line, wherein a first degree of electrical coupling between the first secondary line and the second secondary line is lower than a second degree of electrical coupling between the first secondary line and the primary line and a third degree of electrical coupling between the second secondary line and the primary line, and the first secondary line and the second secondary line are insulated from each other within the multilayer body.

18. The directional coupler according to claim 17, wherein the first secondary line and the second secondary line are at different positions in a stacking direction of the plurality of insulator layers.

19. The directional coupler according to claim 18, wherein the first secondary line and the second secondary line are at positions that sandwich the primary line in the stacking direction of the plurality of insulator layers.

20. The directional coupler according to claim 17, wherein the first secondary line and the second secondary line are at positions that sandwich the primary line in a stacking direction of the plurality of insulator layers.

* * * * *